United States Patent [19]

Neal

[11] 3,797,058
[45] Mar. 19, 1974

[54] APPARATUS FOR CLEANING LARGE RINGS
[76] Inventor: Robert D. Neal, 1902 Kirkwood Cir., Carrollton, Tex. 75006
[22] Filed: Dec. 11, 1972
[21] Appl. No.: 313,772

[52] U.S. Cl.................... 15/21 D, 15/21 C, 51/104, 51/290
[51] Int. Cl............................................. A46b 13/02
[58] Field of Search...... 15/21 R, 21 B, 21 C, 21 D, 15/93 R, 97 R; 51/49, 51, 104, 106, 179, 236, 290

[56] References Cited
UNITED STATES PATENTS

| | | | |
|---|---|---|---|
| 1,283,948 | 11/1918 | Stevens | 15/21 D |
| 1,603,249 | 10/1926 | Stevens | 15/21 D |
| 1,768,335 | 6/1930 | Stevens | 15/97 R |
| 1,924,005 | 8/1933 | Stevens | 15/21 B |
| 3,108,299 | 10/1963 | Baldwin | 15/21 R |
| 3,561,032 | 2/1971 | Kasnyik | 15/21 C |

Primary Examiner—Edward L. Roberts
Attorney, Agent, or Firm—Peter J. Murphy; Cecil L. Wood

[57] ABSTRACT

For cleaning die pallet rings which may range in diameter from 18 in. to over 6 ft., and which consist of a generally cylindrical rim portion, an outer flange, and an inner flange, the cleaning apparatus includes support means consisting of a base carrying two rotatable support wheels for supporting and guiding the ring, and an adjustable guide wheel on a standard for guiding the upper periphery of the ring and supporting the ring in a vertical plane. One of the base support wheels is adjustable to accommodate rings of different size. A powered radial brush for cleaning the rim surface of the ring, is adjustably mounted on the frame to position the brush relative to a particular size of ring, and is also movable by a power cylinder into and out of engagement with the surface to be cleaned during operation. Two powered cup brushes are mounted on the frame to engage side surfaces of the ring, each of these being mounted for reciprocating movement into and out of engagement with the ring during operation by a power cylinder. The brush units may be mounted on suitable carriages for movement parallel to the plane of the supported ring, to accommodate rings of different size. An overhead frame supports a track and hoist for loading and unloading rings from the apparatus.

11 Claims, 4 Drawing Figures

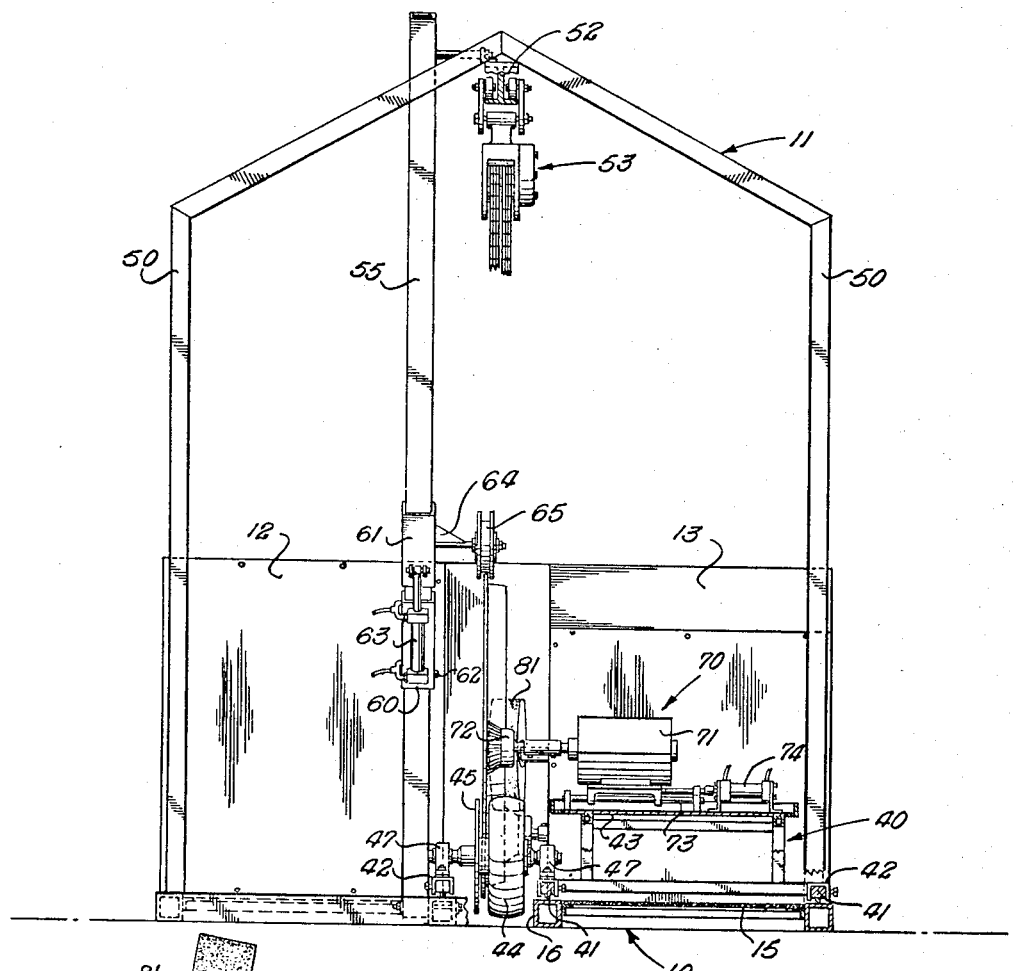
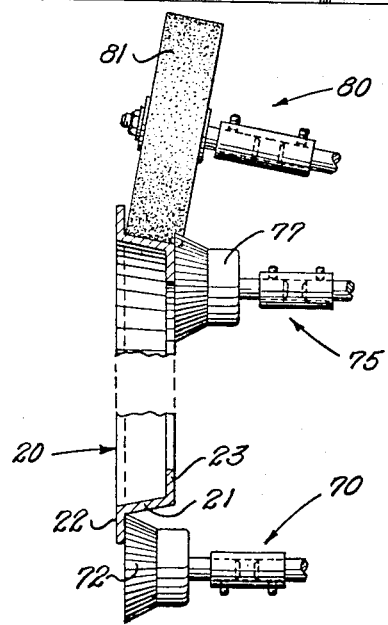
Fig. 4
Fig. 3

3,797,058

APPARATUS FOR CLEANING LARGE RINGS

BACKGROUND AND SUMMARY OF THE INVENTION

This invention relates to apparatus for the cleaning of large rings, particularly die pallet rings which are used in the manufacture of concrete pipe.

In the process of manufacturing concrete pipe, die pallet rings or socket curing pallets are used over and over; and prior to each use must be thoroughly cleaned of material adhering to the pallet from the previous usage. In present practice this is frequently done by hand resulting in a high labor cost and frequently inefficient and ineffective cleaning. To have the most efficient and economic use of the pallets, it is important that the pallets be processed rapidly after each use for subsequent reuse. This practice would reduce the number of pallets which must be available at the manufacturing plant.

While some mechanized apparatus has been made available for pallet cleaning operations such apparatus has been uneconomic and inefficient since it is limited to the handling of rings of a single size or rings within a very small range of sizes.

In a typical concrete pipe plant, pipe may be made at different times varying in diameter from 12 to 108 inches; and of course the plant must have on hand a sufficient quantity of pallets for manufacturing the desired volume of each size pipe. It is desirable to have apparatus that can accomplish the desired cleaning operation in a relatively short time; and this requires apparatus which facilitates the loading and unloading of the pallets from the apparatus, and which performs a cleaning cycle in a short period of time. With apparatus having a short cleaning cycle, it can be made most efficient and economic if it is also adapted to handle pipe of a wide range of sizes so that the maximum use can be made of each pallet cleaning machine which might be used in a concrete pipe manufacturing plant. Also the apparatus should provide for quick change-over from one size pallet to another.

Accordingly it is a principal object of this invention to provide an improved mechanized apparatus for cleaning die pallets.

Another object of this invention is to provide such apparatus which is adapted to handle a wide range of sizes of pallets, and which is readily changed over to handle a pallet of different size.

A further object of this invention is to provide such apparatus wherein the pallets may be easily and quickly loaded and unloaded from the apparatus.

Still another object is to provide such apparatus which is simple and rugged in construction, and provides for ease of operation.

These objects are accomplished in apparatus which includes a base having first and second rotatable support units spaced about horizontal axes for supporting a ring member in a vertical plane. A drive motor drives the first rotatable support unit, and a carriage for the second rotatable support unit is mounted for rectilinear movement relative to the first unit. An upright standard mounted on the base carries a carriage mounted for rectilinear movement, which in turn carries a rotatable guide unit for supporting the ring member at its upper periphery; and this carriage is secured to the standard at selected positions. At least one powered brush unit is adjustably mounted on the base for movement relative to the ring support plane; with the powered brush unit comprising a platform, a rotary drive motor mounted for reciprocating movement on the platform, a rotary brush driven by the motor, and power means for selectively reciprocating the brush motor relative to th platform to engage the brush with the ring member. The platform is adjustably mounted on the base.

More particularly, a plurality of brush units are provided, and suitable control means are provided for rotating the supported ring, driving the several brushes of the brush units, and moving the rotating brushes into engagement with the rotating ring.

The novel features and the advantages of the invention, as well as additional objects thereof, will be understood more fully from the following description when read in connection with the accompanying drawings.

DRAWINGS

FIG. 3 is a diagrammatic illustration of the several brush cleaning functions for the apparatus of FIG. 1; and FIG. 4 is a fragmentary front elevation view.

DESCRIPTION OF THE PREFERRED EMBODIMENT

Figure 1:
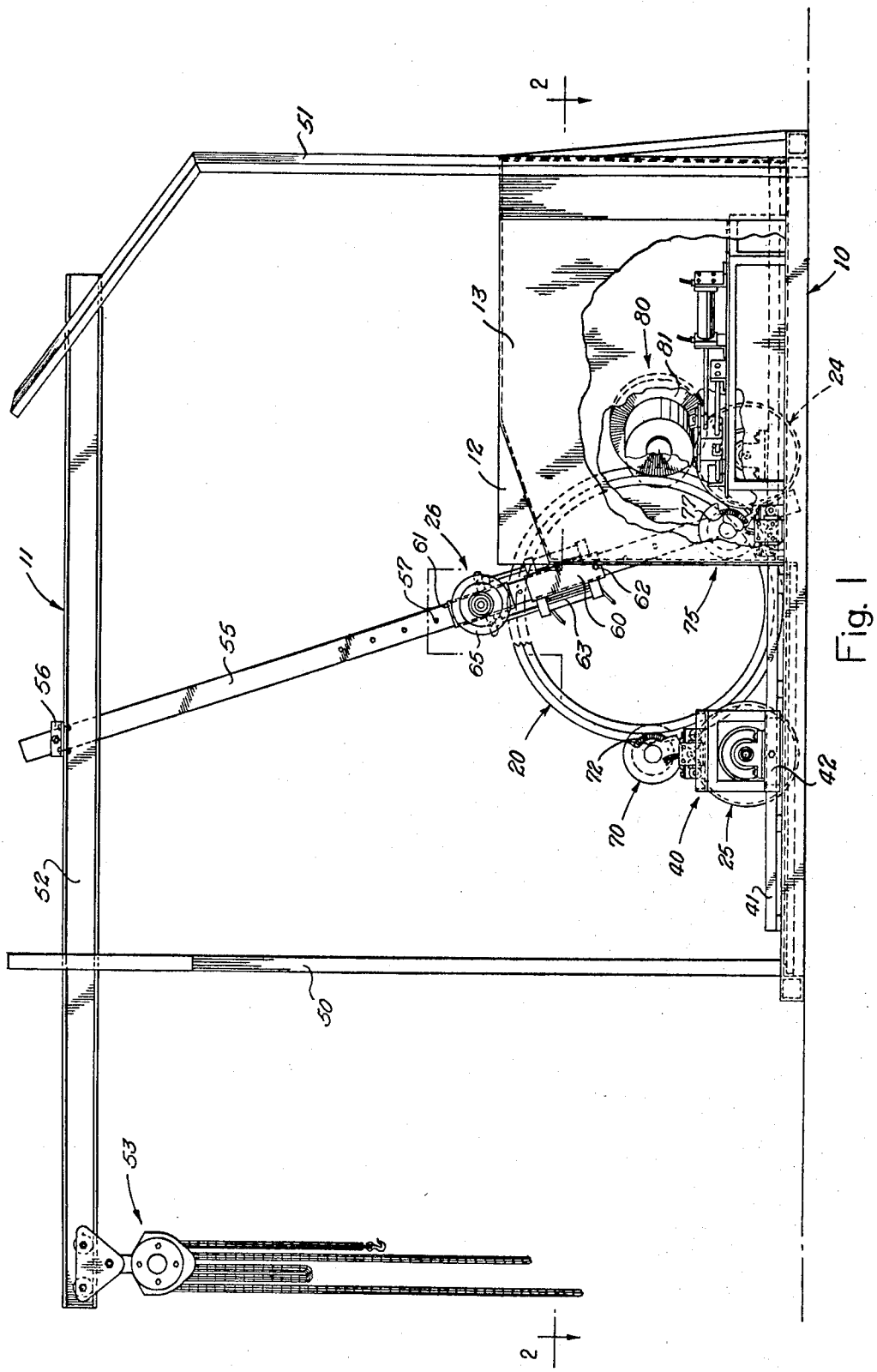
FIG. 1 is a side view of apparatus according to the invention, partially broken away to show the relationships of the component parts to each other and to a supported ring.

Referring to the drawings, a preferred form of apparatus according to the invention includes a base 10, a superstructure frame 11, and housings 12 and 13 which enclose certain components of the apparatus to be described. The base 10 is generally rectangular, with the housings 12 and 13 being mounted at the rear edge of the base and of the apparatus; and accordingly FIG. 1 is a side view of the right side of the apparatus, as viewed from the front.

As best seen in FIG. 3, the base is made up of framing members such as 4 × 4 steel tubing preferably welded together and defining left and right floor portions 14 and 15 having suitable floor panels, and defining between them a floor opening or slot 16 extending from the front to the rear of the apparatus base.

A die pallet ring 20, as illustrated in the drawings, may have a nominal diameter of 36 inches for example and, as best seen in FIG. 3, includes a rim portion 21, an outer radial flange 22 and an inner radial flange 23, these flanges extending from opposite edges of the rim portion.

The ring 20 is supported in a generally vertical plane above the floor slot 16 by means of two rotatable support units 24 and 25 mounted on the base and an upper rotatable guide unit 26 supported above the base 10.

Figure 2:
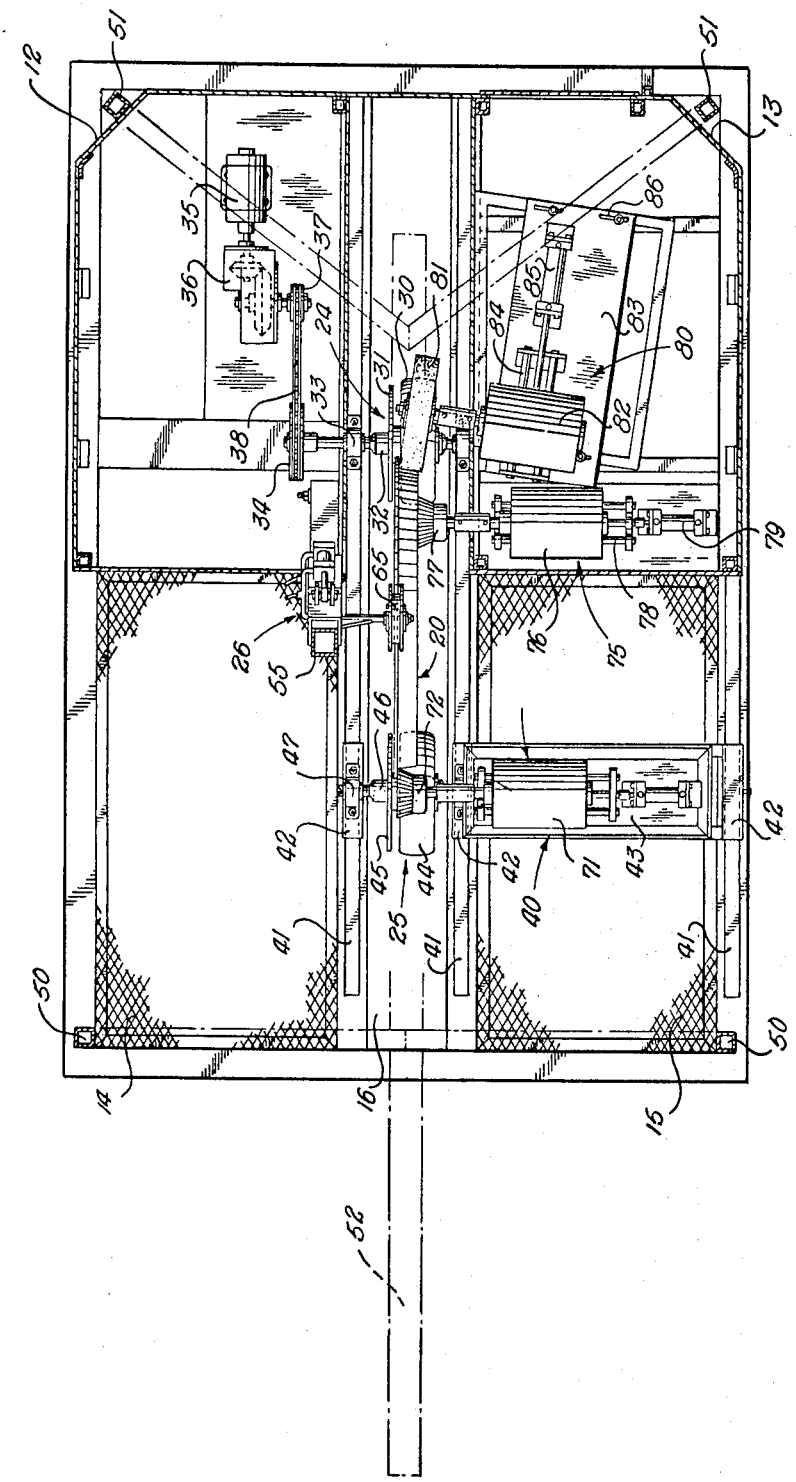
FIG. 2 is a top view of the apparatus from the plane 2—2 of FIG. 1.

The support unit 24 is also the drive unit for rotating the pallet ring 20 and, as best seen in FIG. 2, consists of a rubber tired wheel 30 and a disk 31 mounted in spaced relation on a shaft 32 which is journaled in bearings 33 mounted on the opposite sides of the base slot 16. The shaft extends into the housing 12 and carries a sprocket 34. This unit is driven by an electric motor 35 through a gear reduction unit 36 driving a sprocket 37 coupled to sprocket 34 by a suitable drive chain 38. The wheel 30 and the disk 31 define an annular groove for accommodating and retaining the ring outer flange 22 with the rim portion 21 supported on the wheel 30.

The idler support unit 25 has a similar construction and is carried on a carriage 40 supported for reciprocating sliding movement on the base 10 on three parallel rails 41 two of which are mounted on opposite sides of the floor slot 16. The carriage includes three runners 42 which engage the respective rails and are locked thereto by suitable locking screws to position the carriage and associated components a desired distance from the drive support unit 24. The idler support unit also consists of a rubber tired wheel 44 and spaced disk 45 both fixed to a shaft 46 mounted in bearings 47 which are supported on the carriage runners 42 on the opposite sides of the floor slot.

The superstructure frame 11 for the apparatus consists of front posts 50 and rear posts 51 which are angled at the top to support a rail 52 which is disposed horizontally in the plane of the floor slot 16. The rail 52 is in the form of an I-beam for supporting a chain hoist and trolley 53, with the rail extending from a point near the rear end of the apparatus and projecting forwardly from the front end.

An upright standard 55, in the form of a 4 × 4 steel tube for example, is pivotally mounted at its lower end to the base 10 and is anchored at the top to the rail 52, with the standard being angled forward and upward as viewed from the side. The standard is anchored at the rail 52 by means of a bracket 56; and the rail is provided with several longitudinally spaced sets of mounting holes for the bracket 56 so that the bracket may be selectively located at selected points along the rail for the purpose of changing the angle of inclination of the standard 55. The standard is provided with longitudinally spaced sets of transversely aligned holes 57, for the purpose of anchoring the guide unit 26 as will now be described.

The guide unit 26 includes a lower square sleeve 60 and an upper square sleeve 61 both dimensioned for sliding relation with the square standard 55. The lower sleeve is provided with transverse holes positioned for alignment with the holes 57 of the standard, so that the sleeve may be locked in a selected position by means of a suitable locking pin 62. A pair of double-acting pneumatic power cylinders 63 are mounted on the front and rear sides of the lower sleeve 60, having their piston rods secured to brackets on the front and rear sides of the upper sleeve 61. The upper sleeve carries a bracket 64 which rotatably supports a grooved wheel 65, having a groove dimensioned to receive the outer pallet flange 22 and thereby guide and support the pallet ring in the vertical support plane. By means of the pneumatic power cylinders, the upper sleeve and wheel 65 are reciprocated to provide for the loading and unloading of rings.

A powered brush unit 70 for cleaning the inner surface of the ring outer flange 22 is best seen in FIGS. 2 and 4, being supported in elevated position on the carriage 40. The carriage consists of horizontal frame members extending between the runners 42, and upright frame members supporting a platform 43. The brush unit includes an electric motor 71 having a wire cup brush 72 fixed on its output shaft. The motor base is slidably supported on slide rods 73 mounted on the platform 43, the slide rods extending perpendicular to the ring support plane. A double-acting pneumatic power cylinder 74, mounted on the platforms, has its piston rod coupled to the motor base for reciprocating the motor and brush into and out of engagement with the ring.

As mentioned above, the entire carriage 40 is movable relative to the base to position the idler support unit relative to the drive support unit to accommodate the desired size of ring which is to be cleaned. This positioning inherently moves the outer flange brush unit; and the platform 43 may be adjustably mounted on the carriage for fine positioning of the brush 72 relative to the ring flange.

An inner flange brush unit 75 consists of similar components including an electric motor 76 carrying a wire cup brush 77 on its shaft with the motor base being mounted on slide rods 78 for reciprocating movement in a direction perpendicular to the ring support plane. This motor is reciprocated by a double-acting pneumatic power cylinder 79. This inner flange brush unit 75 may be mounted on a platform or plate adjustably mounted on the base for fine adjustment of the brush 77.

A rim brush unit 80 includes a radial or street brush 81, mounted on the shaft of a drive motor 82, this unit being supported on a platform 83 contained within the housing 13 as best seen in FIGS. 1 and 2, with the platform being elevated on a suitable frame. Again, the motor base is supported on slide rods 84 mounted on the platform, for reciprocating movement of the motor and brush perpendicular to the outer surface of the pallet ring rim 21. The motor 82 is reciprocated relative to the platform by a double-acting pneumatic power cylinder 85.

As seen in the drawings, the rim surface is not cylindrical, but rather is formed by a generally conical surface. Accordingly, the axis of rotation of the brush is angled slightly relative to the ring supporting plane. In order to accommodate different angles of inclination of the conical rim, and for other fine adjustment of the brush 81, the mounting platform 80 is adjustable relative to its supporting platform; and for this purpose the platform is provided with mounting slots 86 by means of which the platform is secured to its frame by means of suitable bolts.

The operation of the above described apparatus will now be described in connection with a preferred electrical and pneumatic operating circuit. The electrical circuit preferably includes a first circuit and control switch for operating the drive motor 35 for the drive support unit 24; and a second circuit and associated control switch for simultaneously operating the several brush unit motors 71, 76 and 82. The pneumatic circuit may consist of a first circuit including a four-way operating valve for controlling the pneumatic power cylinders 63 which reciprocate the upper carriage and wheel 65 of the guide unit 26; and a second pneumatic circuit and associated four-way operating valve for controlling simultaneously the power cylinders 74, 79 and 85 for the several brush units. In the "normal" position of these operating valves, the guide wheel 65 is maintained out of engagement with the die pallet ring and the several brushes are positioned out of the respective ring engaging positions.

For setting up the apparatus to accommodate a particular size pallet ring, such as a nominal 36 inch diameter for example, the ring is loaded onto the apparatus by means of the chain hoist 53, and may be supported by the hoist while the carriage 40 and the idler support unit 25 are adjusted relative to the drive support unit to provide adequate base support for the pallet ring and to position the outer flange brush 72 in the approximate position for cleaning the outer flange surface. The guide unit 26 is then properly positioned by removing the locking pin 62 for the lower sleeve 60 and repositioning the unit so that the wheel 65 is adjacent to the ring flange 22. This wheel 65 should be approximately above the center of rotation of the pallet ring; and if this is not the case the position may be adjusted forwardly and rearwardly by changing the upper mounting position of the standard 55 relative to the rail 52. The cylinders 63 are then actuated to engage the wheel 65 with the ring flange.

Next the rim brush unit 80 may be adjusted relative to the rim surface 21 by appropriate adjustment of the platform 83 relative to its supporting frame. The inner flange brush unit 75 may be adjusted by appropriate positioning of its mounting platform relative to the apparatus base; and the outer flange brush unit 70 may be adjusted and aligned through adjustment of its mounting platform 43 relative to the carriage frame.

The cleaning cycle then would be to energize the electric circuit for the drive motor 35 to rotate the pallet ring, energize the electric circuit for the brush drive motors to rotate the several brushes, then operate the pneumatic brush control valve to the "operate" position to move the several brushes into engagement with respect to surfaces to be cleaned. At the completion of cleaning, the brush control valve is again shifted to the normal position to retract the brushes from the cleaned surfaces, and the two motor control switches are switched to the off position to stop all drive motors.

Next the cleaned ring is engaged by the hoist and the pneumatic circuit for the guide unit is shifted to the normal position to release the wheel 65 from the ring flange, whereby the ring 20 may be removed from the apparatus using the hoist, and another ring of the same size loaded onto the apparatus.

What has been described is apparatus for the intended purpose which is convenient to use and simple in operation, which is adjustable to handle pallet rings of varying size constructed to handle rings of large and considerable weight, and which enables the economic cleaning of die pallet rings.

While three particular brush units have been described, it will be apparent that a greater or lesser number of brush units may be employed with the apparatus. While pneumatic power cylinders have been described for reciprocating the several brush units, it will be apparent that other forms of reciprocating power devices may be used.

While the preferred embodiment of the invention has been illustrated and described, it will be understood by those skilled in the art that other changes and modifications may be resorted to without departing from the spirit and scope of the invention.

What is claimed is:

1. Apparatus for cleaning a ring member comprising a base; first and second support units mounted on said base for rotation about spaced horizontal axes, for supporting a ring member in a generally vertical plane; a drive motor mounted on said base for driving said first rotatable support unit; carriage means for said second support unit, adjustably mounted on said base for receiprocating movement relative to said first support unit; an upright standard mounted on said base; a carriage mounted on said standard for rectilinear movement therealong; a guide unit rotatably mounted on said last named carriage about an axis parallel to the axes of said support units; means for securing said guide unit carriage at selected positions on said standard; said support units and said guide unit defining a three point rotatable support for a ring member;

at least one powered brush unit mounted on said base; and said powered brush unit comprising a platform, a rotary drive motor mounted for rectilinear movement on said platform, a rotary brush driven by said motor, power means mounted on said platform for selectively reciprocating said brush drive motor relative thereto; and said platform being mounted on said base to position said brush for powered movement into and out of engagement with a ring surface.

2. The apparatus of claim 1 for cleaning a ring member including a rim portion and an external flange portion each of said rotatable support units comprising a first rotor having a resilient peripheral surface for engagement with the ring rim portion, and a second rotor spaced from said first rotor to define a groove for accommodating and guiding said external flange portion.

3. The apparatus of claim 1 said means for securing said guide unit carriage comprising a second guide unit carriage mounted for rectilinear movement, means for locking said second guide unit carriage at selected positions on said standard, and at least one extensible fluid motor coupling said first and second guide unit carriages for reciprocating the first carriage relative to the second carriage.

4. The apparatus of claim 1 said power means for selectively reciprocating said brush drive motor comprising an extensible fluid motor coupling said motor and said platform.

5. The apparatus of claim 1 a plurality of said powered brush units mounted on said base; each powered brush unit comprising a platform, a rotary motor mounted for reciprocating movement on said platform, a rotary brush driven by said motor, and power means mounted on said platform for reciprocating said brush motor relative thereto; and said brush unit platforms being mounted on said base to position said brushes for powered movement into and out of engagement with respective ring surfaces.

6. The apparatus of claim 5 one of said powered brush units including a radial brush for engagement with a rim surface of said ring member, with said powered reciprocating means moving said brush in its rotating plane toward and away from the respective ring member surface; and at least one other powered brush unit including a cup brush, with the brush being movable in the direction of the rotational axis of the brush to bring the brush into engagement with a side surface of the ring member.

7. The apparatus of claim 5 each of said powered brush units including an electric rotary motor for driving its respective brush; said power means for driving said first rotatable support unit comprising an electric rotary motor;

control means for said apparatus comprising a first switch means for energizing said support unit drive motor, second switch means for energizing said brush unit drive motors, and a control device for actuating the brush unit powered reciprocating means.

8. The apparatus of claim 5 said powered reciprocating means comprising double-acting pneumatic power cylinders.

9. The apparatus of claim 1 an overhead frame supported on said base; said standard being pivotally mounted on said base and being secured to said frame at its upper end; and means on said overhead frame for selectively positioning the upper end of said standard to select the angle of inclination of said standard.

10. The apparatus of claim 1 an overhead frame mounted on said base; rail means supported on said frame, disposed in parallel relation to said base and generally in the ring member support plane defined by said support and guide units; and a hoist supported on said rail for rectilinear movement therealong.

11. The apparatus of claim 1 said powered brush unit comprising a radial brush carried on its rotary motor shaft;

a mounting plate for said powered brush units; said mounting plate carrying guide means for rectilinear movement of said motor carriage and extensible fluid motor coupled between said plate and said motor carriage and defining said means for selectively reciprocating said brush units;

said mounting plate being adjustable relative to said base to orient said brush relative to the ring surface to be cleaned.

* * * * *